United States Patent
Lee (10) Patent No.: US 7,902,714 B2
(45) Date of Patent: Mar. 8, 2011

(54) MOTOR STATOR

(76) Inventor: Sheng-Chung Lee, Kaohsiung Hsien (TW)

(*) Notice: Subject to any disclaimer, the term of this patent is extended or adjusted under 35 U.S.C. 154(b) by 243 days.

(21) Appl. No.: 12/244,783

(22) Filed: Oct. 3, 2008

(65) Prior Publication Data

US 2010/0084940 A1  Apr. 8, 2010

(51) Int. Cl.
*H02K 3/18* (2006.01)
(52) U.S. Cl. .......... 310/180; 310/184; 310/195; 310/198
(58) Field of Classification Search .......... 310/179, 310/180, 182, 184, 187, 205–206, 195, 198; 318/785, 797, 104, 494–496, 519; 242/433, 242/433.1–433.4
See application file for complete search history.

(56) References Cited

U.S. PATENT DOCUMENTS

| | | | | |
|---|---|---|---|---|
| 653,906 A * | 7/1900 | Brown | .......... | 318/785 |
| 1,644,718 A * | 10/1927 | Fitzgerald | .......... | 310/206 |
| 1,725,662 A * | 8/1929 | Merrill | .......... | 310/160 |
| 2,103,165 A * | 12/1937 | Merrill | .......... | 310/163 |
| 2,873,924 A * | 2/1959 | Glazier et al. | .......... | 242/444 |
| 3,940,646 A * | 2/1976 | Buckman | .......... | 310/166 |
| 4,275,339 A * | 6/1981 | Burke et al. | .......... | 318/400.26 |
| 4,577,139 A * | 3/1986 | Reinhardt et al. | .......... | 318/400.41 |
| 4,918,347 A * | 4/1990 | Takaba | .......... | 310/179 |
| 5,006,745 A * | 4/1991 | Nishio et al. | .......... | 310/177 |
| 5,268,609 A * | 12/1993 | Sakashita et al. | .......... | 310/179 |
| 5,407,142 A * | 4/1995 | Trevisan | .......... | 242/433 |
| 5,516,054 A * | 5/1996 | Machida et al. | .......... | 242/433 |
| 5,661,355 A * | 8/1997 | Darceot | .......... | 310/180 |
| 6,700,276 B2 * | 3/2004 | Hakamata | .......... | 310/179 |
| 7,459,824 B2 * | 12/2008 | Haner | .......... | 310/179 |
| 2003/0155834 A1 * | 8/2003 | Enomoto et al. | .......... | 310/218 |
| 2009/0021100 A1 * | 1/2009 | Lee | .......... | 310/208 |

FOREIGN PATENT DOCUMENTS

| | | | |
|---|---|---|---|
| EP | 653827 A1 * | 5/1995 | |
| JP | 61-231853 | * | 10/1986 |
| JP | 2002-10597 | * | 1/2002 |
| WO | 9406197 A1 * | 3/1994 |

* cited by examiner

*Primary Examiner* — Burton Mullins (57) ABSTRACT

A motor stator includes a silicon steel seat wound with six sets of starting coils and six sets of operating coils formed with resistant enameled coils. The six sets of starting coils are respectively made of the resistant enameled coils in directions respectively of entering into a first slot and out a fifth slot of the silicon steel seat, entering into a second slot and out a sixth slot, entering into a third slot and out a seventh slot, entering into an eleventh slot and out a seventh slot, entering into a twelfth slot and out an eighth slot, and entering into a first slot and out a ninth slot. And the six sets of operating coils are respectively composed of the resistant enameled coils in directions respectively different from the winding directions of the six sets of starting coils, able to quickly and evenly complete winding work.

2 Claims, 7 Drawing Sheets

MOTOR STATOR

BACKGROUND OF THE INVENTION

1. Field of the Invention

This invention relates to a motor stator, and particularly to one able to quickly complete winding work, economizing resistant enameled wires and enabling resistant enameled coils to be arranged safely and evenly.

2. Description of the Prior Art

A conventional in-runner motor stator has a silicon steel seat bored with a plurality of coil holes respectively inserted therein with an insulating thimble; and then plural resistant enameled coils are respectively inserted through the insulating thimbles and wound on the silicon steel seat. After the resistant enameled coils are wound on the silicon steel seat, each set of coil has to be trimmed and bunched by means of cotton yarn. It is difficult to wind the coils of the conventional motor stator evenly and smoothly and hence they have to be pressed flat and fixed in shape. Therefore, the whole winding and wire trimming work becomes extremely complicated, and in the course of pressing and shaping, the coils are likely to be damaged to affect their exciting effect. Apparently, it requires lots of time and trouble to make the conventional motor stator, and the exciting field of the conventional motor stator is comparatively small, thus consuming a great quantity of electric power.

SUMMARY OF THE INVENTION

The objective of this invention is to offer a motor stator able to quickly complete winding work, saving resistant enameled coils and enabling resistant enameled coils to be arranged and distributed evenly and safely.

A first feature of the invention is that a silicon steel seat is wound thereon with six sets of starting coils and six sets of operating coils formed with resistant enameled coils. The six sets of starting coils are respectively formed with the resistant enameled coils in a direction respectively of entering into a first slot and exiting from a fifth slot of the silicon steel seat, entering into a second slot and exiting from a sixth slot, entering into a third slot and exiting from a seventh slot, entering into an eleventh slot and exiting from a seventh slot, entering into a twelfth slot and exiting from an eighth slot, and entering into a first slot and exiting from a ninth slot. And the six sets of operating coils are respectively made with the resistant enameled coil in a direction respectively of entering into a fourth slot and exiting from an eighth slot, entering into a fifth slot and exiting from a ninth slot, entering into a sixth slot and exiting from a tenth slot, entering into a second slot and exiting from a tenth slot, entering into a third slot and exiting from an eleventh slot, and entering into the fourth slot and exiting from the twelfth slot.

A second feature of the invention is to have a silicon steel seat wound thereon with six sets of starting coils and six sets of operating coils formed with resistant enameled coils. The six sets of starting coils are respectively constituted with the resistant enameled coils in a direction respectively of entering into the fifth slot and exiting from the first slot of the silicon steel seat, entering into the sixth slot and exiting from the second slot, entering into the seventh slot and exiting from the third slot, entering into the seventh slot and exiting from the eleventh slot, entering into the eighth slot and exiting from the twelfth slot, and entering into the ninth slot and exiting from the first slot. And the six sets of operating coil are respectively composed of the resistant enameled coils in a direction respectively of entering into the eighth slot and exiting from the fourth slot, entering into the ninth slot and exiting from the fifth slot, entering into the tenth slot and exiting from the sixth slot, entering into the tenth slot and exiting from the second slot, entering into the eleventh slot and exiting from the third slot, and entering into the twelfth slot and exiting from the fourth slot.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
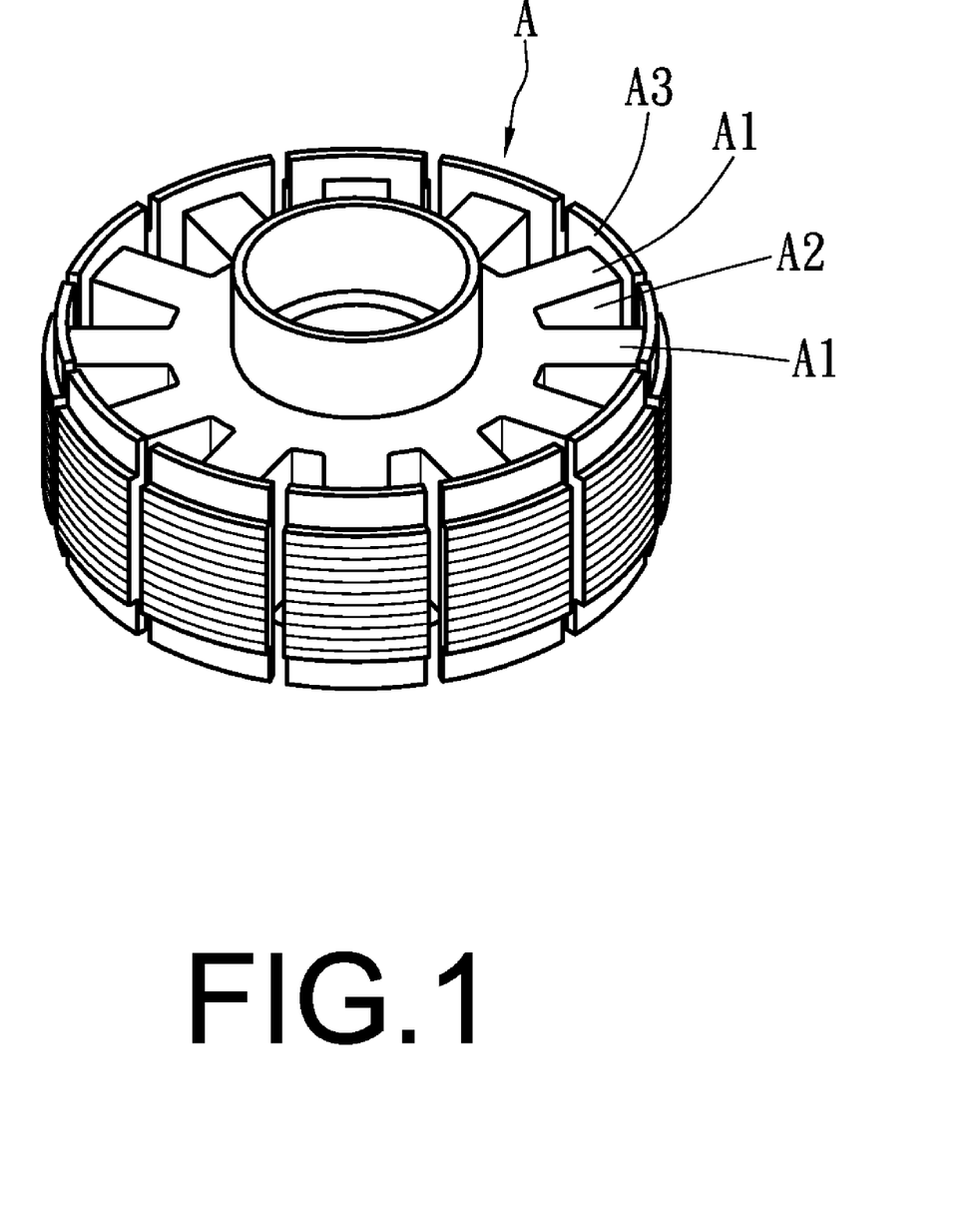
FIG. 1 is a perspective view of the silicon steel seat of a motor stator in the present invention.

A first preferred embodiment of a motor stator in the present invention, as shown in FIG. 1, includes a silicon steel seat (A) disposed thereon with twelve insulating poles A1 spaced apart equidistantly; and twelve slots. Every two adjacent insulating poles A1 are formed with a respective one of the slots A2. Each insulating pole A1 has its outer end provided with a wall A3 with a certain height.

Figure 2:
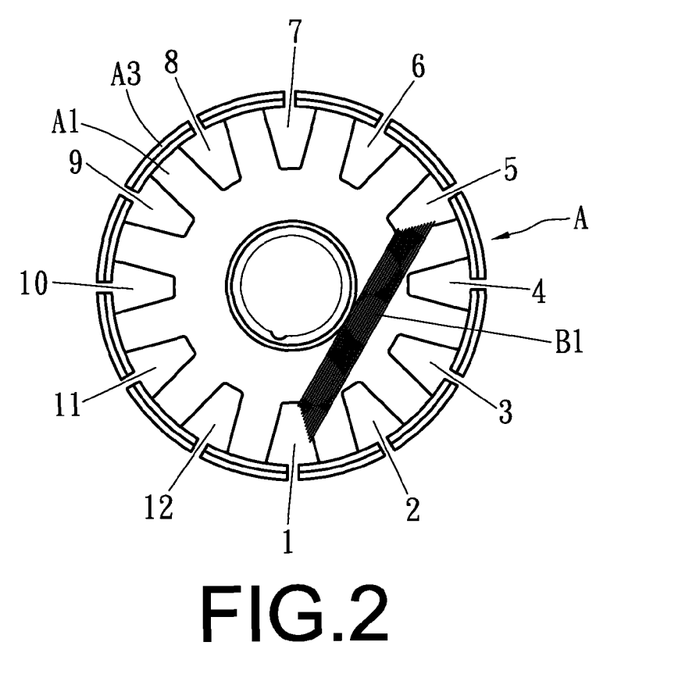
FIG. 2 is an upper view of a first set of starting coil wound on the silicon steel seat in the present invention.
Figure 3:
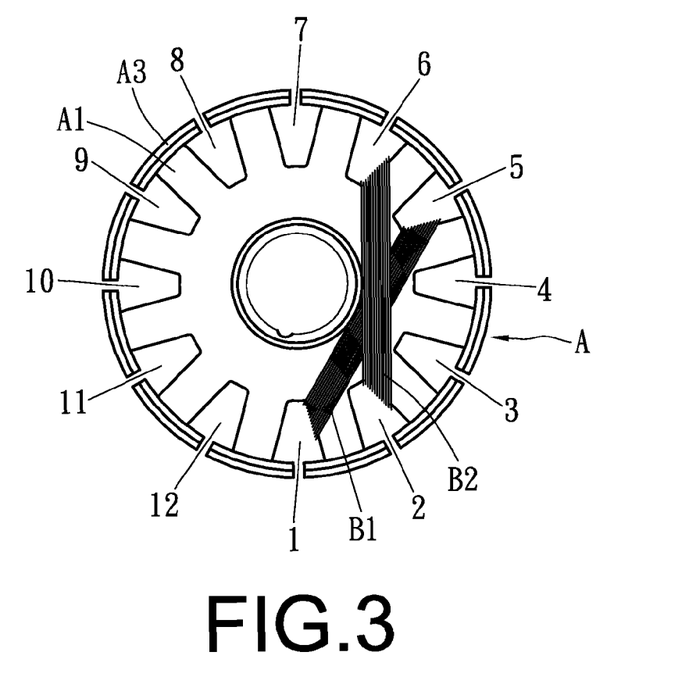
FIG. 3 is an upper view of a second set of starting coil wound on the silicon steel seat in the present invention.
Figure 4:
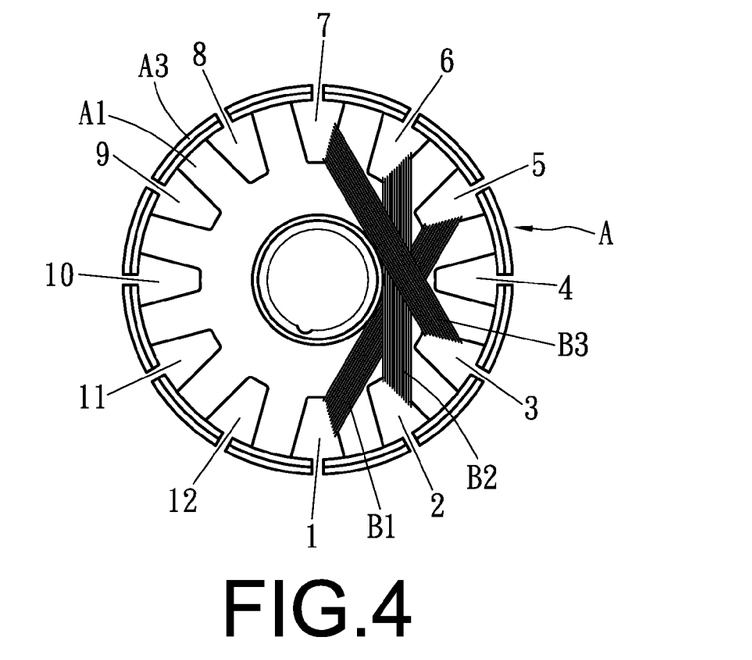
FIG. 4 is an upper view of a third set of starting coil wound on the silicon steel seat in the present invention.
Figure 5:
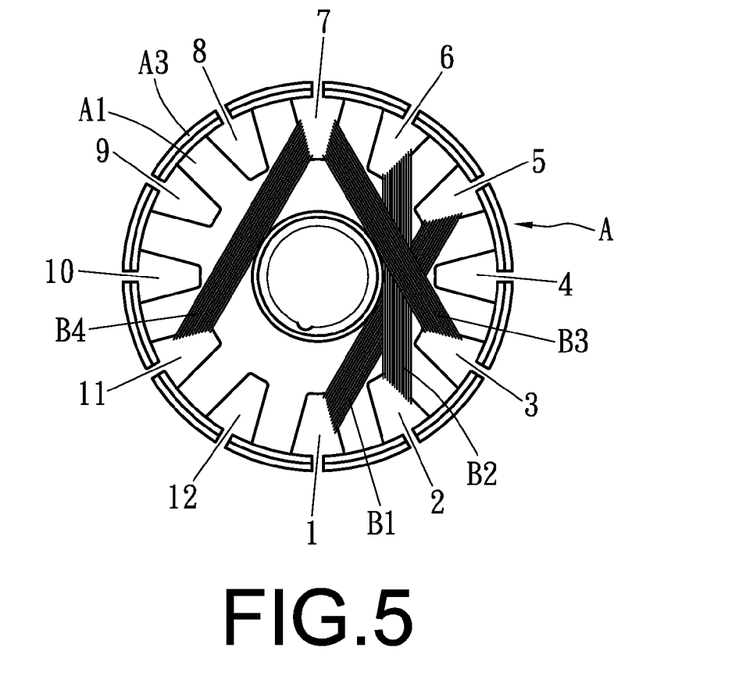
FIG. 5 is an upper view of a fourth set of starting coil wound on the silicon steel seat in the present invention.
Figure 6:
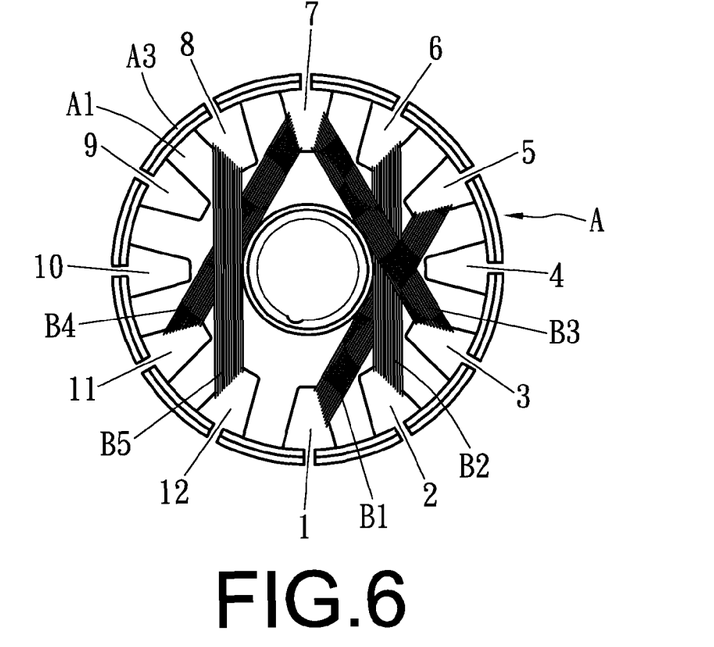
FIG. 6 is an upper view of a fifth set of starting coil wound on the silicon steel seat in the present invention.
Figure 7:
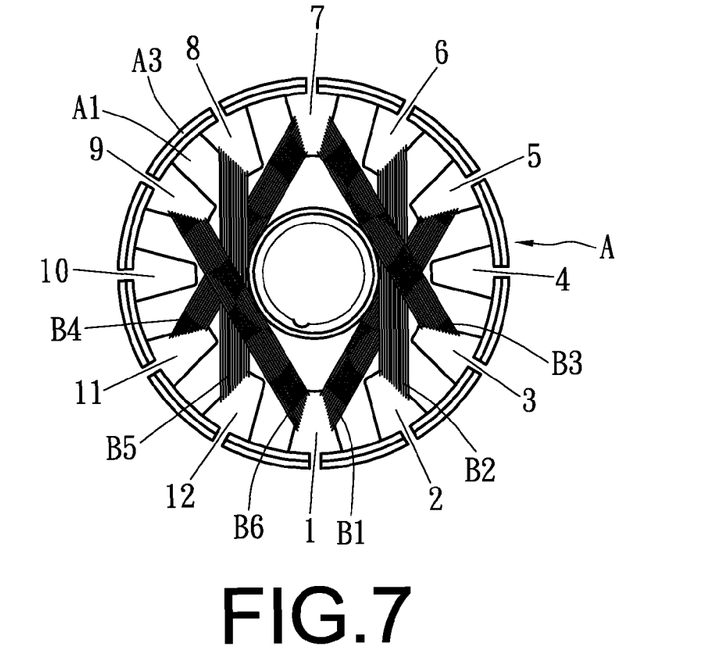
FIG. 7 is an upper view of a sixth set of starting coil wound on the silicon steel seat in the present invention.
Figure 8:
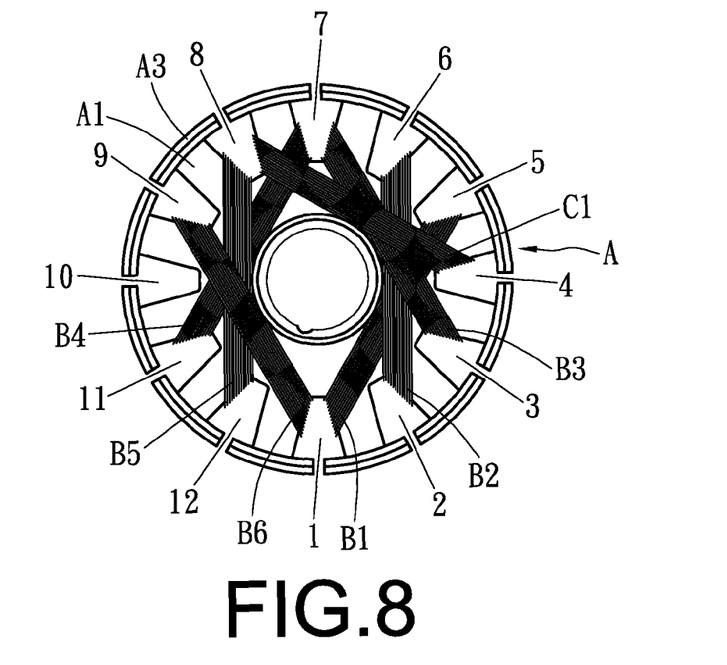
FIG. 8 is an upper view of a first set of operating coil wound on the silicon steel seat in the present invention.
Figure 9:
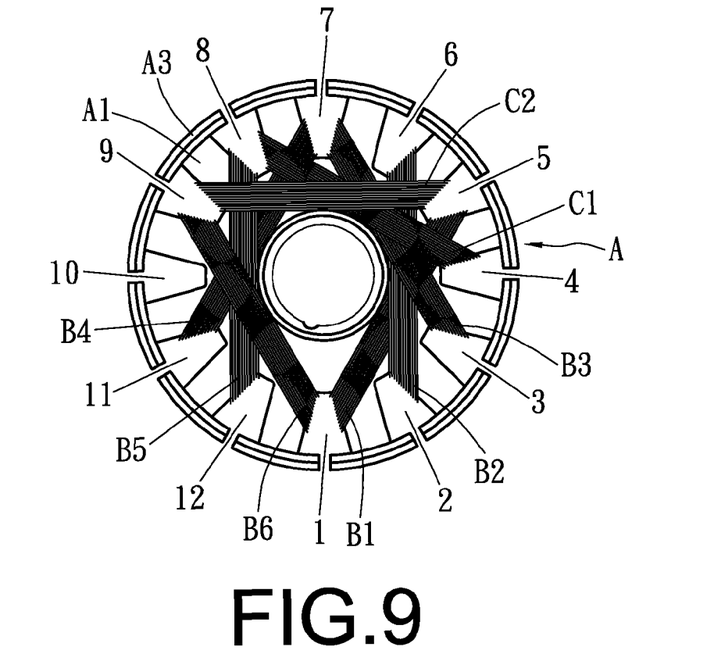
FIG. 9 is an upper view of a second set of operating coil wound on the silicon steel seat in the present invention.
Figure 10:
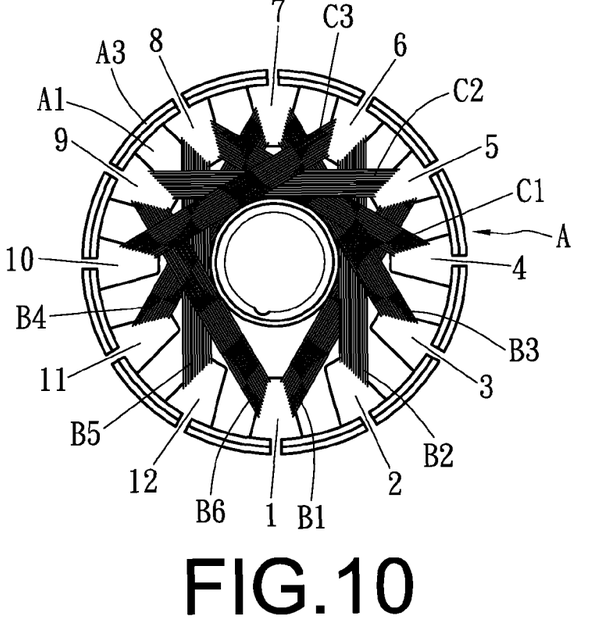
FIG. 10 is an upper view of a third set of operating coil wound on the silicon steel seat in the present invention.
Figure 11:
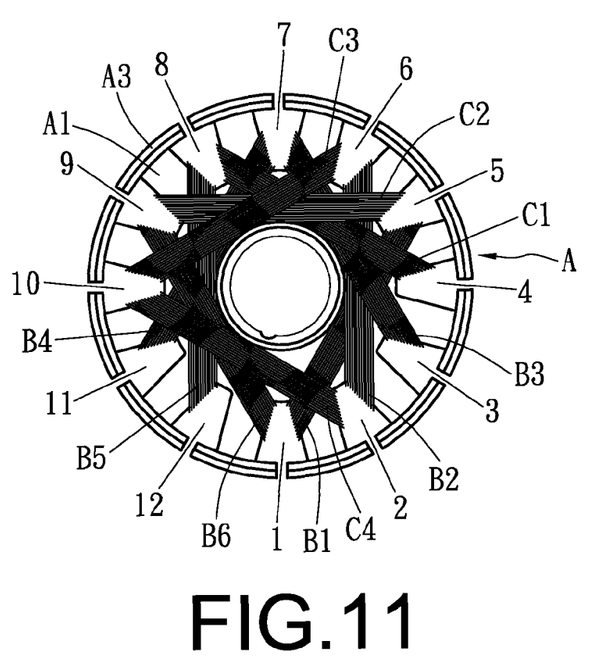
FIG. 11 is an upper view of a fourth set of operating coil wound on the silicon steel seat in the present invention.
Figure 12:
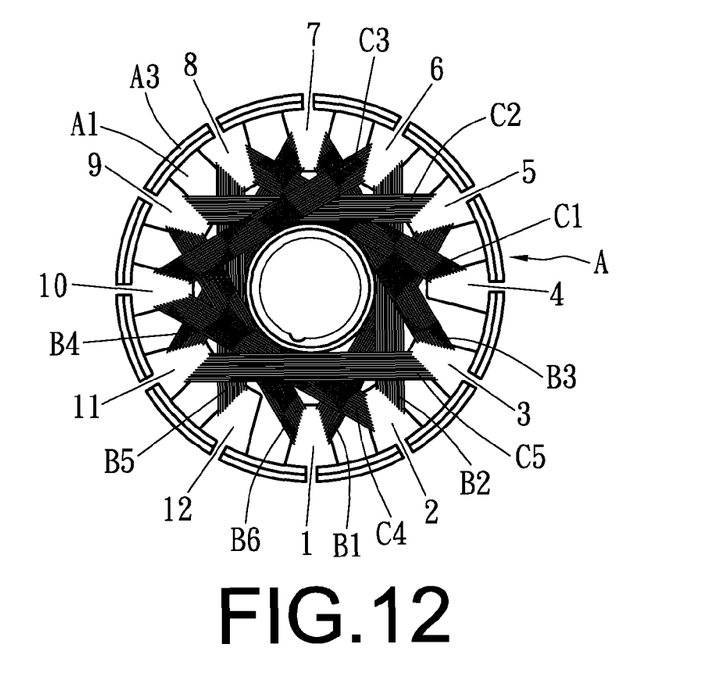
FIG. 12 is an upper view of a fifth set of operating coil wound on the silicon steel seat in the present invention.
Figure 13:
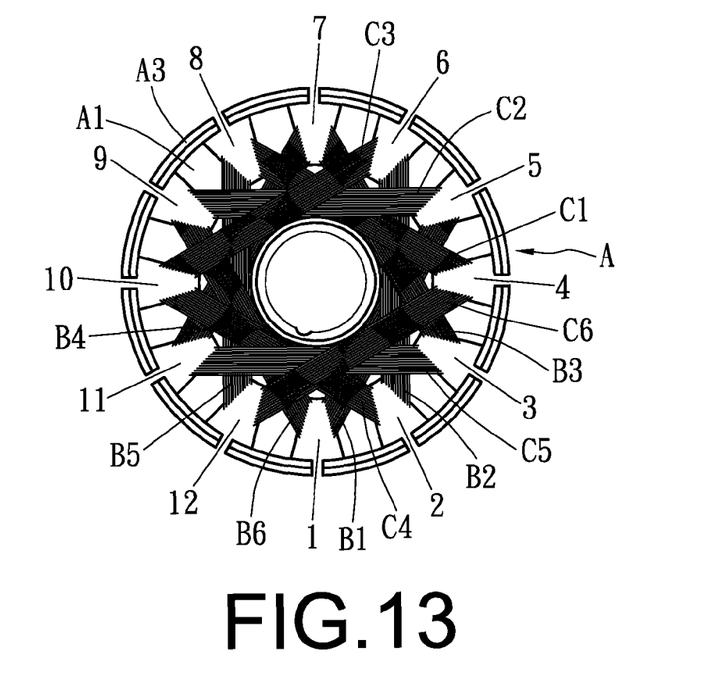
FIG. 13 is an upper view of a sixth set of operating coil wound on the silicon steel seat in the present invention.

The silicon steel seat (A) is wound thereon with six sets of starting coils B1, B2, B3, B4, B5 and B6 and six sets of operating coils C1, C2, C3, C4, C5 and C6 all formed with resistant enameled coils, as shown in FIGS. 2~13. The first set of starting coil B1 is formed with the resistant enameled coil which enters into the first slot 1 and exits from the fifth slot 5 of the silicon steel seat (A), as shown in FIG. 2; the second starting coil B2 is formed with the resistant enameled coil which enters into the second slot 2 and exits from the sixth slot 6 of the silicon steel seat (A), as shown in FIG. 3; the third set of starting coil B3 is formed with the resistant enameled coil which enters into the third slot 3 and exits from the seventh slot 7 of the silicon steel seat (A), as shown in FIG. 4; the fourth set of starting coil B4 is formed with the resistant enameled coil which enters into the eleventh slot 11 and exits from the seventh slot 7 of the silicon steel seat (A), as shown in FIG. 5; the fifth set of starting coil B5 is formed with the resistant enameled coil which enters into the twelfth slot 12 and exits from the eighth slot 8 of the silicon steel seat (A), as shown in FIG. 6, and the sixth set of starting coil B6 is formed with the resistant enameled coil which enters into the first slot 1 and exits from the ninth slot 9 of the silicon steel seat (A), as shown in FIG. 7. And the first set of operating coil C1 is made of the resistant enameled coil which enters into the fourth slot 4 and exits from the eighth slot 8 of the silicon steel seat (A), as shown in FIG. 8; the second set of operating coil C2 is made of the resistant enameled coil which enters into the fifth slot 5 and exits from the ninth slot 9 of the silicon steel seat (A), as shown in FIG. 9; the third set of operating coil C3 is made of the resistant enameled coil which enters into the sixth slot 6 and exits from the tenth slot 10 of the silicon steel seat (A), as shown in FIG. 10; the fourth set of operating coil is made of the resistant enameled coil which enters into the second slot 2 and exits from the tenth slot 10 of the silicon steel seat (A), as shown in FIG. 11; the fifth operating coil C5 is made of the resistant enameled coil which enters into the third slot 3 and exits from the slot 11 of the silicon steel seat (A), as shown in FIG. 12, and the sixth set of operating coil is made of the resistant enameled coil which enters into the fourth slot 4 and exits from the slot 12 of the silicon steel seat (A), as shown in FIG. 13.

A second preferred embodiment of a motor stator in the present invention has the same structure as that described in the first preferred embodiment, having the silicon steel seat (A) wound thereon with six sets of starting coils B1, B2, B3, B4, B5 and B6 and six sets of operating coils C1, C2, C3, C4, C5 and C6, as shown in FIGS. 2~13, only that the winding directions of the resistant enameled coils in the second preferred embodiment are respectively opposed to those described in the first preferred embodiment. In the second preferred embodiment, the first set of starting coil B1 is composed of the resistant enameled coil which enters into the fifth slot 5 and exits from the slot 1 of the silicon steel seat (A), as shown in FIG. 2; the second set of starting coil B2 is composed of the resistant enameled coil which enters into the sixth slot 6 and exits from the second slot 2 of the silicon steel seat (A), as shown in FIG. 3; the third set of starting coil B3 is composed of the resistant enameled coil which enters into the seventh slot 7 and exits from the third slot 3 of the silicon steel seat (A), as shown in FIG. 4; the fourth set of starting coil B4 is composed of the resistant enameled coil which enters into the seventh slot 7 and exits from the eleventh slot 11 of the silicon steel seat (A), as shown in FIG. 5; the fifth set of starting coil B5 is composed of the resistant enameled coil which enters into the eighth slot 8 and exits from the twelfth slot 12 of the silicon steel seat (A), as shown in FIG. 6, and the sixth set of starting coil B6 is composed of the resistant enameled coil which enters into the ninth slot 9 and exits from the first slot 1 of the silicon steel seat (A), as shown in FIG. 7. And the first set of operating coil C1 is constituted with the resistant enameled coil which enters into the eighth slot 8 and exits from the fourth slot 4 of the silicon steel seat (A), as shown in FIG. 8; the second set of operating coil C2 is constituted with the resistant enameled coil which enters into the ninth slot 9 and exits from the fifth slot 5 of the silicon steel seat (A), as shown in FIG. 9; the third set of operating coil C3 is constituted with the resistant enameled coil which enters into the tenth slot 10 and exits from the sixth slot 6 of the silicon steel seat (A), as shown in FIG. 10; the fourth set of operating coil C4 is constituted with the resistant enameled coil which enters into the tenth slot 10 and exits from the second slot 2 of the silicon steel seat (A), as shown in FIG. 11; the fifth set of operating coil C5 is constituted with the resistant enameled coil which enters into the eleventh slot 11 and exits from the third slot 3 of the silicon steel seat (A), as shown in FIG. 12, and the sixth set of operating coil C6 is constituted with the resistant enameled coil which enters into the twelfth slot 12 and exits from the fourth slot 4 of the silicon steel seat (A), as shown in FIG. 13.

As can be understood from the above description, this invention has the following advantages.

1. By foresaid winding modes, the six sets of starting coils B1, B2, B3, B4, B5 and B6 are mutually interlaced and superposed on the silicon steel seat (A), and the six sets of operating coils C1, C2, C3, C4, C5 and C6 are correspondingly interlaced and superposed on the six sets of starting coils B1, B2, B3, B4, B5 and B6, thus enabling all the coils to be arranged and distributed evenly on the silicon steel seat (A).

2. All the coils are positioned at the inner sides of the walls A3 of the silicon steel seat (A) to be segregated and protected by the walls A3 so as to avoid the coils being bumped and damaged.

3. All the sets of coils can be evenly and quickly wound among the slot es A2 of the silicon steel seat (A), needless to carry out wire trimming work, and able to save personnel expense and man-hours and reduce the amount of coils needed.

4. All the sets of coils can be smoothly and evenly disposed on the silicon steel seat (A), able to greatly elevate exciting effect of the coils, lower resistant, reduce consumption of electricity and increase rotating velocity.

While the preferred embodiments of the invention have described above, it will be recognized and understood that various modifications may be made therein and the appended claims are intended to cover all such modifications that may fall within the spirit and scope of the invention.

What is claimed is:

1. A motor stator comprising a silicon steel seat, said silicon steel seat disposed with a plurality of insulating poles spaced apart equidistantly, every two adjacent insulating poles being formed with a slot, the number of said slots being equal to that of said insulating poles, an outer end of each said insulating pole being installed with a wall: and characterized by said silicon steel seat wound thereon with six sets of starting coils and six sets of operating coils formed with resistant enameled coils, said six sets of starting coils respectively formed with said resistant enameled coils in a direction respectively of entering into a first said slot and exiting from a fifth said slot, entering into a second said slot and exiting from a sixth said slot, entering into a third said slot and exiting from a seventh said slot, entering into an eleventh said slot and exiting from a seventh said slot, entering into a twelfth said slot and exiting from an eighth said slot, and entering into a first said slot and exiting from a ninth said slot, said six sets of operating coils respectively made of said resistant enameled coils in a direction respectively of entering into a fourth said slot and exiting from an eighth said slot, entering into a fifth said slot and exiting from a ninth said slot, entering into a sixth said slot and exiting from a tenth said slot, entering into a second said slot and exiting from a tenth slot, entering into a third said slot and exiting from a said eleventh slot and entering into a fourth said slot and exiting from a twelfth said slot.

2. A motor stator provided with a silicon steel seat, said silicon steel seat disposed with a plurality of insulating poles spaced apart equidistantly, plural slots; each slot being respectively formed between two adjacent ones of said insulating poles, the number of said slots being equal to the number of said insulating poles, an outer end of each said insulating pole being installed with an wall: and characterized by said silicon steel seat wound thereon with six sets of starting coils and six sets of operating coils, said six sets of starting coils respectively constituted with said resistant enameled coil in a direction respectively of entering into a fifth said slot and exiting from a first said slot, entering into a sixth said slot and exiting from a second said slot, entering into a seventh said slot and exiting from a third said slot, entering into a seventh said slot and exiting from a eleventh said slot, entering into an eighth said slot and exiting from a twelfth said slot, and entering into a ninth said slot and exiting from a first said slot; said six sets of operating coils respectively formed with said resistant enameled coil in a direction respectively of entering into an eighth said slot and exiting from a fourth said slot, entering into a ninth said slot and exiting from a fifth said slot, entering into a tenth said slot and exiting from a sixth said slot, entering into a tenth said slot and exiting from a second said slot, entering into an eleventh said slot and exiting from a third said slot, and entering into a twelfth said slot and exiting from a fourth said slot.

* * * * *